Feb. 3, 1970  R. G. HEINRICH  3,492,762
LAPPING DEVICE

Filed Jan. 3, 1967  9 Sheets-Sheet 1

ROBERT G. HEINRICH
INVENTOR.

BY

AGENT

ROBERT G. HEINRICH
INVENTOR.

AGENT

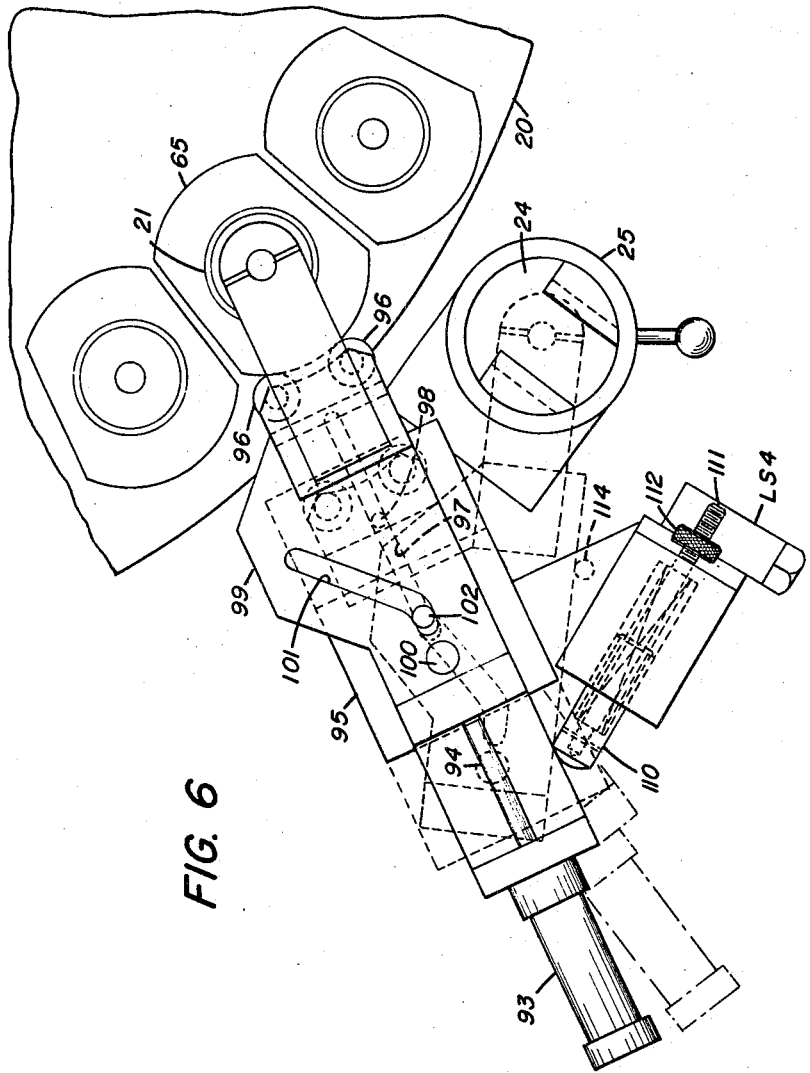

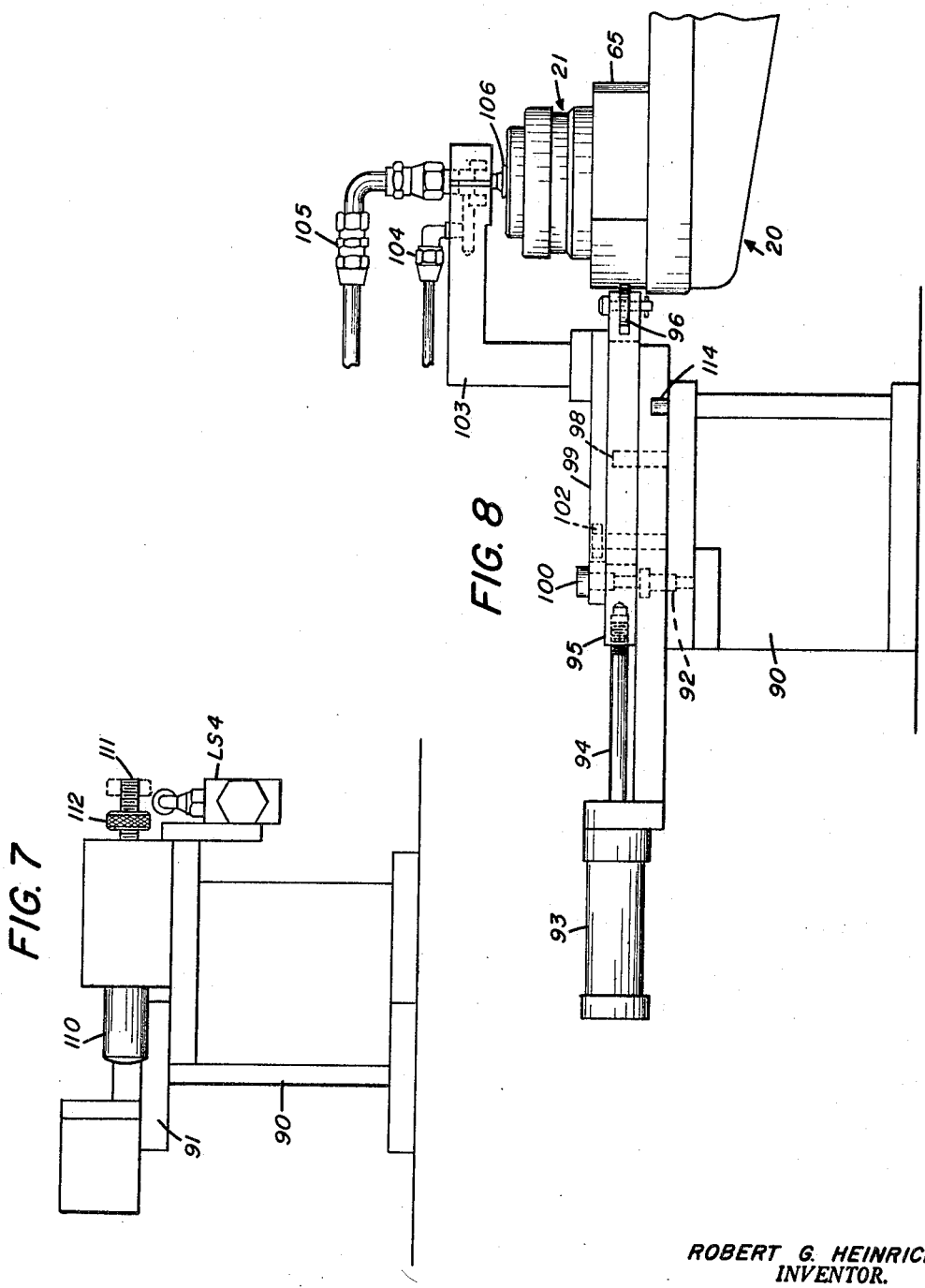

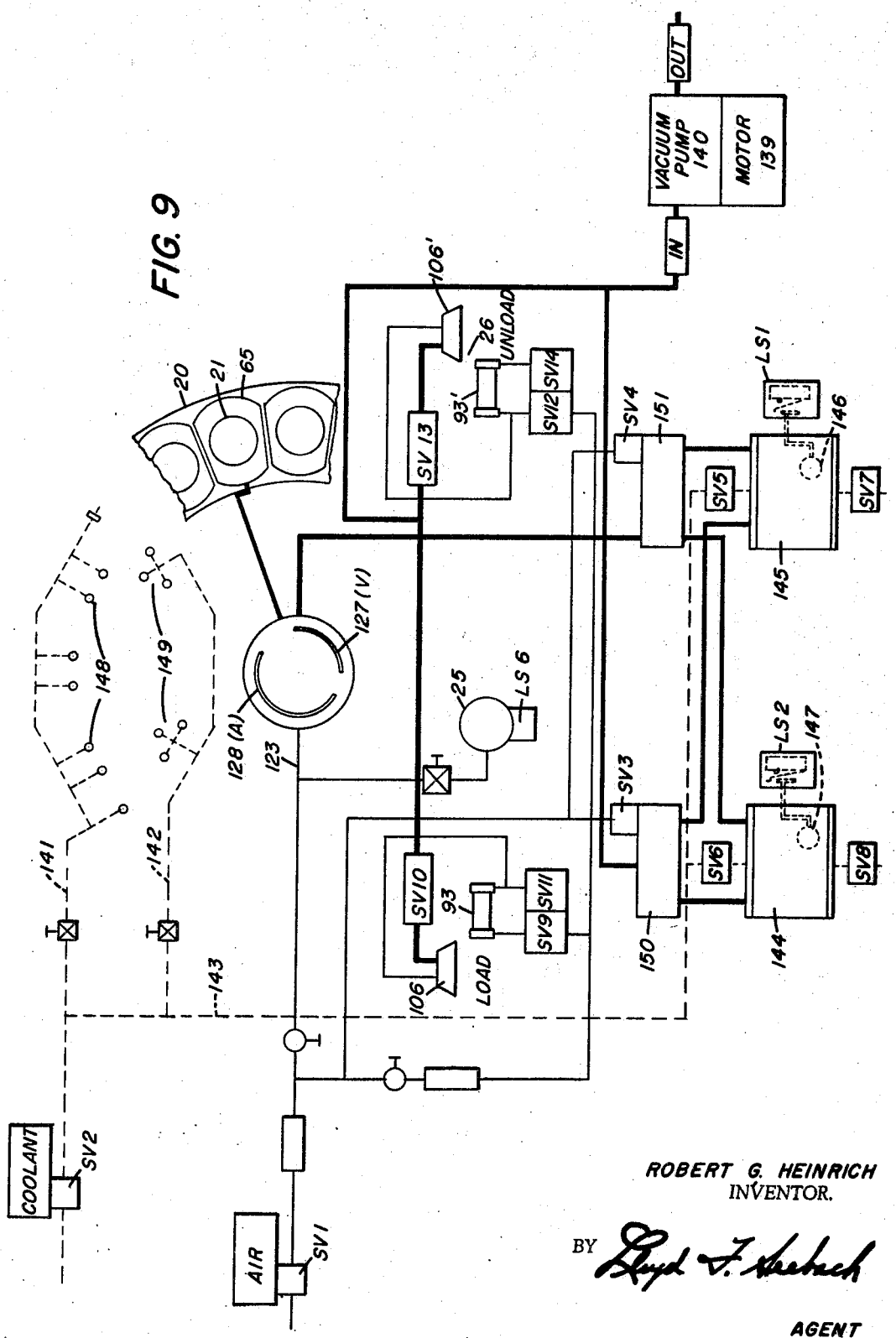

Feb. 3, 1970 — R. G. HEINRICH — 3,492,762
LAPPING DEVICE
Filed Jan. 3, 1967 — 9 Sheets-Sheet 9
FIG. 10
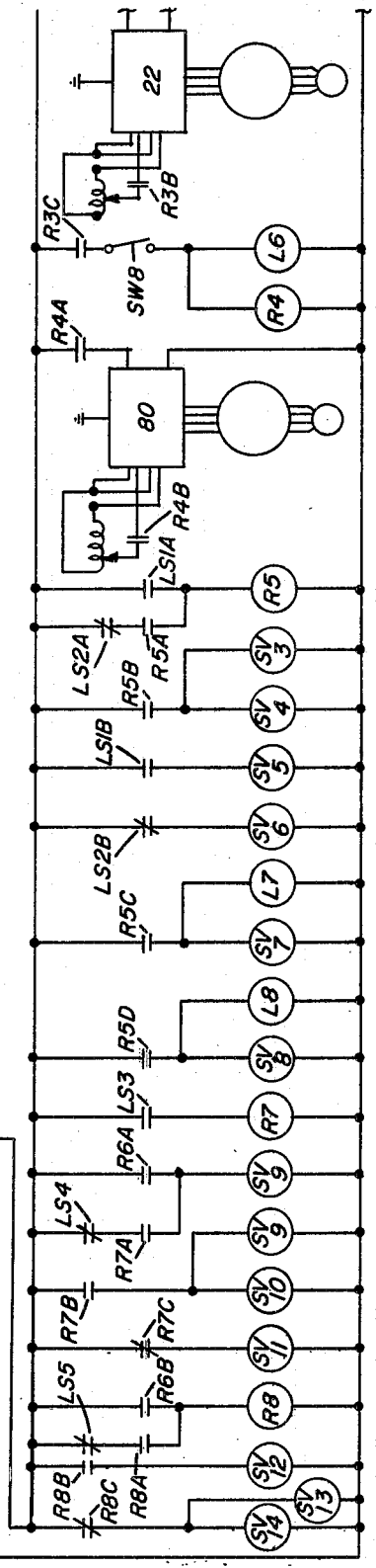
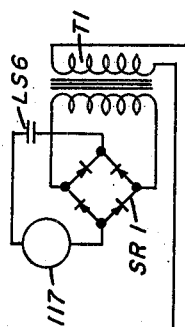
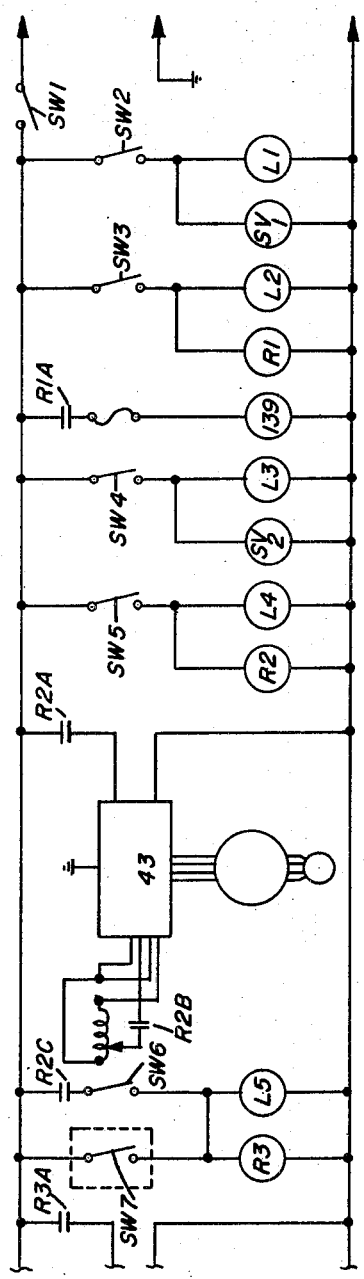
ROBERT G. HEINRICH
INVENTOR.
BY
AGENT United States Patent Office 3,492,762
Patented Feb. 3, 1970

3,492,762
LAPPING DEVICE
Robert G. Heinrich, Rochester, N.Y., assignor to Hamco Machines and Electronics Corporation, Rochester, N.Y., a corporation of New York
Filed Jan. 3, 1967, Ser. No. 606,908
Int. Cl. B24b 5/00
U.S. Cl. 51—134                                    13 Claims

ABSTRACT OF THE DISCLOSURE

A device for lapping the planar surface of a plurality of discrete elements in which each element is moved, while being rotated, in a prescribed path relative to a lapping surface so as to obtain random surface contact with the lapping surface. Control means are provided so the elements are of uniform thickness, the amount of material removed from each element being automatically and individually controlled. The elements are automatically positioned on and removed from a carrier which moves the elements through the prescribed path.

---

The present invention relates to a lapping device and more particularly to such a device for simultaneously lapping the planar surfaces of each of a plurality of elements to precise thickness and parallelism tolerances.

It is well known in the lapping art to provide apparatus that is capable of imparting a smooth surface to a planar surface or to a peripheral surface of an element. In such apparatus the element is usually made of metal and the problem of damage to the elements by breakage, chipping and/or marking of another element being worked on is an ever present possibility. In such apparatus, the need for closely controlling the degree of flatness of a planar surface, or the curvature of a peripheral surface, is not as difficult to accomplish when compared to more brittle materials, such as glass, ceramic material, etc.

In the field of glass polishing or lapping, it is customary to mount glass discs or lenses on a carrier member by means of pitch or other suitable materials. The carrier is usually rotated, or rotated and oscillated, with respect to the polishing member. Due to the characteristics of glass, particularly its brittleness, a chip from one element that is carried under the polishing member can damage the other elements on the carrier. As a result, the entire group of elements can be scratched or made unusable merely due to the cracking or chipping of one of the elements.

In the electronics field a very thin piece of a crystal, such as germanium, silicone and/or a similar material, is used as the basic element for a transistor. The small piece of crystal is obtained from artificially grown crystals that are usually encapsulated in plastic and then cut into thin wafers. The planar surfaces of the wafers are then lapped or polished until a required thickness, and parallelism of the surfaces as well as very smooth surfaces are attained. The wafers are then cut into small rectangular pieces that are ultimately made into transistors. Due to the cost of the original crystal, it is desirable to obtain as many wafers as possible from each crystal so as to maintain a minimum cost for each transistor element.

Lapping devices for thin crystal wafers, which are only several mils thick, have been devised which follow the general principles for lapping or polishing glass. However, the same shortcomings are prevalent in such wafer lapping devices as in the polishing apparatus used for glass. Due to the high cost of the crystal material, it is desirable to eliminate the possibility of damaging all or even a number of the wafers being lapped when one becomes broken during the lapping process.

A primary object of the invention is to provide an improved device for simultaneously lapping a planar surface of each of a plurality of elements.

Another object of the invention is to provide an improved lapping device wherein elements of different thicknesses can be lapped to attain elements of uniform thickness, the amount of material removed from the surface of each such element being automatically and individually controlled.

A further object of the invention is to provide an improved lapping device which is capable of continuous operation, removes the material from each element at a fast rate, and requires a minimum of manual handling of the elements during the lapping operation.

Still another object of the invention is to provide an improved lapping device in which each element being lapped is rotated in a direction opposite to that of the lapping wheel and in which such rotation of the element is commenced prior to its full engagement with the wheel so as to substantially eliminate any initial engagement of a high area on the element with the wheel and to provide random surface contact with the wheel.

And yet another object of the invention is to provide an improved lapping device in which each element is automatically positioned on a carrier rotated during its movement into and out of engagement with a lapping wheel, and automatically removed from the carrier after the lapping operation has been completed.

Other objects and advantages of the invention will be apparent to those skilled in the art by the description of a preferred embodiment of the invention which follows:

The above objects of the invention are attained by a carrier that continuously moves a plurality of elements in a path, preferably an arcuate path, which extends across a portion of a rotating lapping surface or wheel. Each of the elements is supported upon a rotatable member having means for controlling the amount of material to be removed from its respective element by the lapping surface. Only those supporting members immediately ahead of, aligned with and immediately beyond the lapping surface are rotated so as to eliminate any possibility of damaging the element upon being moved into engagement with the lapping surface. The elements are arranged in a magazine ahead of the lapping wheel and are removed individually therefrom for positioning each element on a support member. On the other side of the lapping wheel, a similar device is arranged for removing each element from its respective supporting member and positioning it on a receiving magazine. Movement of each element onto its respective support member, retention thereon and removal therefrom is accomplished by controlled vacuum means so as to eliminate any mechanical handling of the element as well as any possibility of breakage or damage. Since the lapping device described in more detail hereinafter is fully automatic and has means for controlling the amount of material to be removed, the lapping speed can be greatly increased, thereby increasing the number of elements that can be lapped in a fixed period of time.

Reference is now made to the accompanying drawings wherein like numbers designate like parts and wherein:

FIG. 6 is a plan view showing the relationship of the loading mechanism to the supply magazine for the elements and the support member on which the elements are positioned;

FIG. 7 is a side elevational view taken substantially along the line 7—7 in FIG. 6 and showing the vacuum controlled means;

FIG. 8 is a side elevational view showing the relationship of the load mechanism to a supporting member on the carrier when an element is being positioned thereon; and FIG. 9 is a schematic arrangement of the vacuum and lubricating system used in conjunction with the lapping device; and FIG. 10 is a schematic arrangement of the electrical components used in conjunction with the lapping device.

Figure 1:
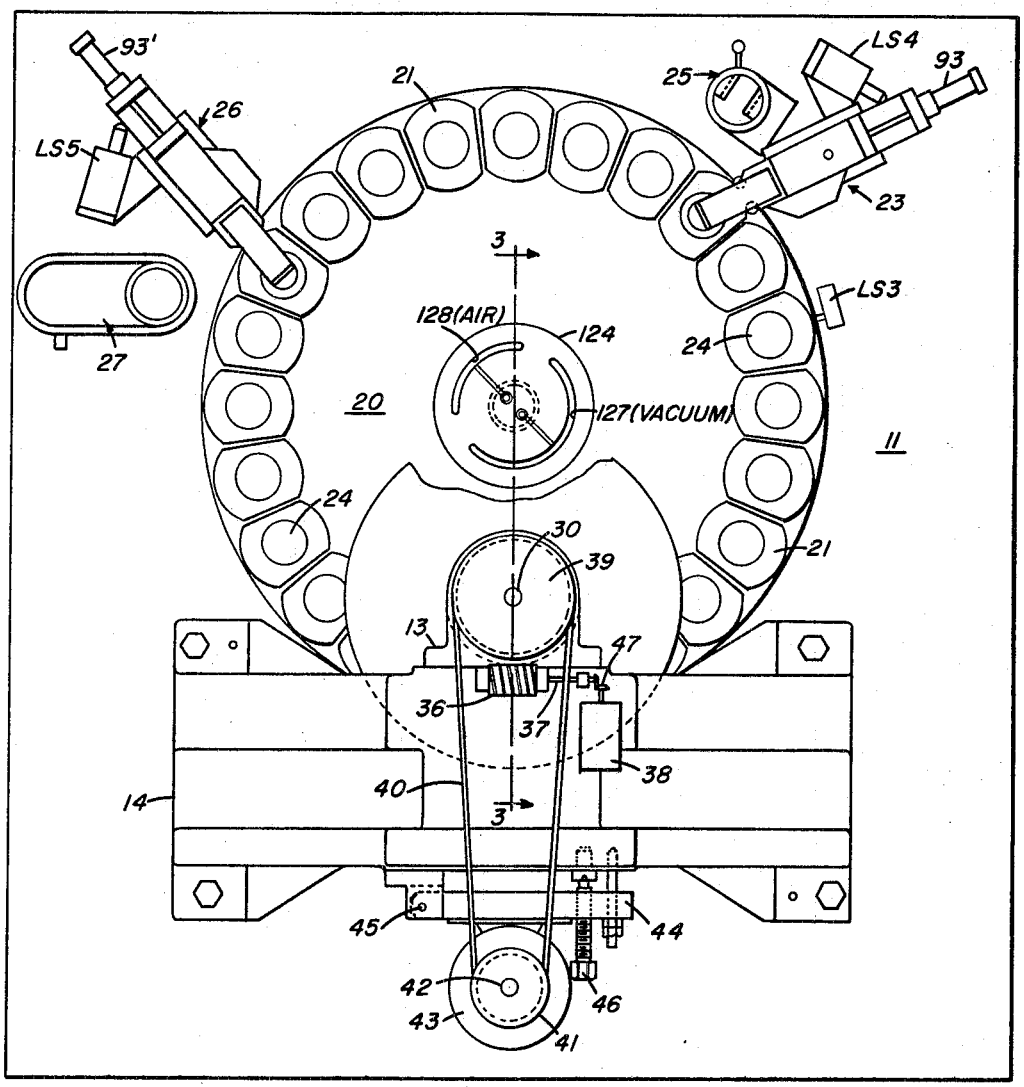
FIG. 1 is a plan view of a preferred form of the invention showing the relation of the load and unload stations to the lapping wheel.
Figure 2:
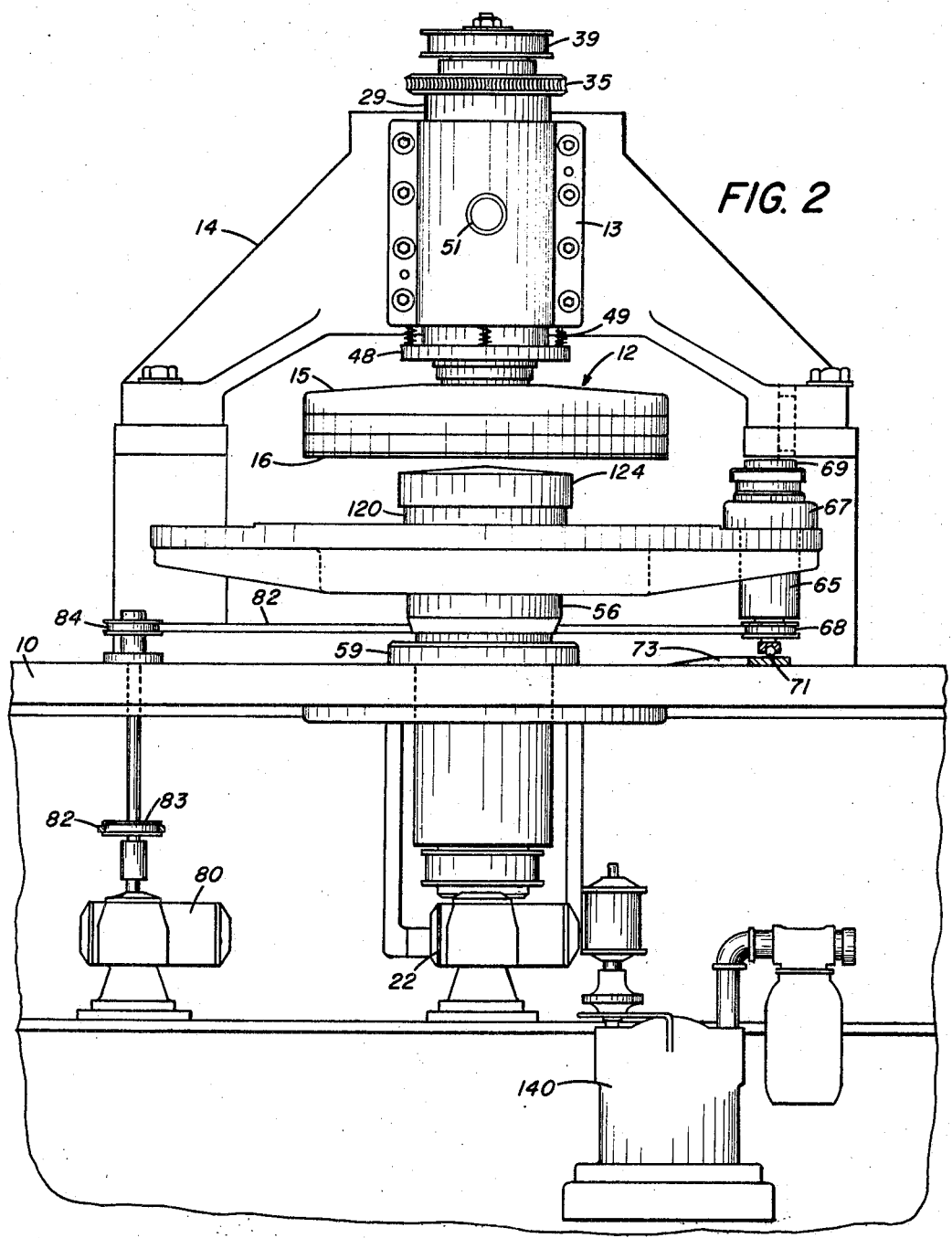
FIG. 2 is a front elevation of the lapping device.
Figure 4:
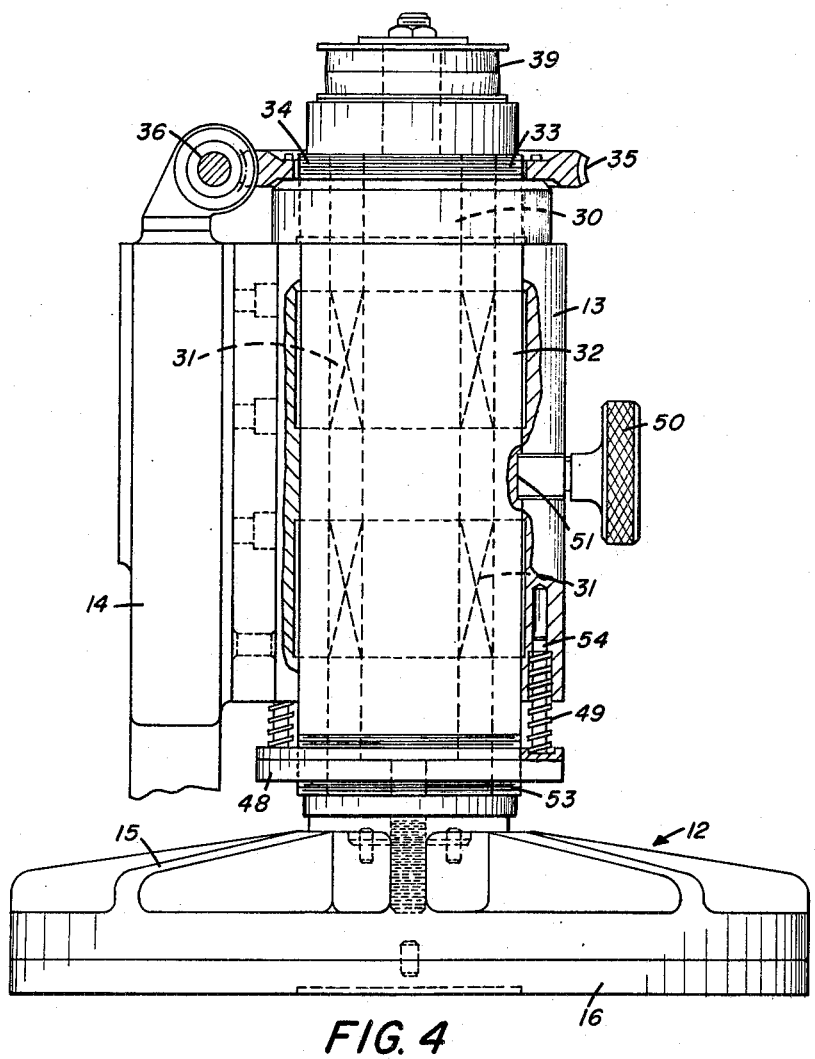
FIG. 4 is a partial sectional view through the central support for the carrier member.

With particular reference to FIGS. 1, 2 and 4 a support means 10 comprises a bedplate 11 which is mounted on a suitable framework not shown so that the bedplate is positioned at a workable height for the operator. A lapping member 12 is rotatably mounted in a bracket 13 that is fixed to a support bracket 14 which, in turn, is mounted on the bedplate 11.

Figure 5:
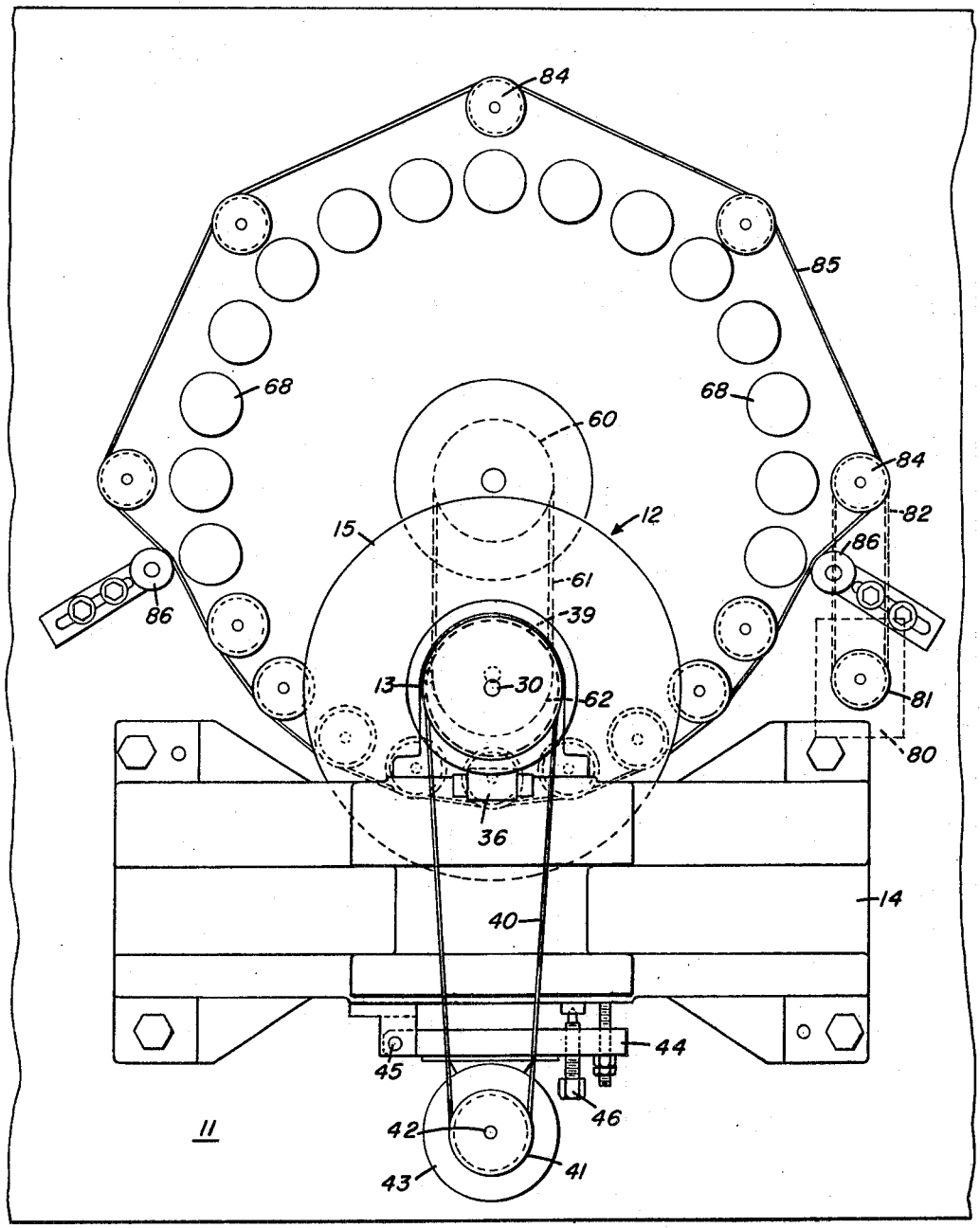
FIG. 5 is a plan view taken along substantially the line 5—5 in FIG. 3 and showing particularly the drive means for the support member.

The lapping member 12 comprises a cast disc 15 having a lapping wheel 16 secured thereto in any well known manner. The lapping member 12 overlies a carrier 20 on which a plurality of supporting members 21 are rotatably mounted. The carrier 20 is rotated by a separate drive motor 22 and moves the supporting elements in an arcuate path across a portion of the lapping wheel 16, as seen in FIGS. 1 and 5. Loading or positioning means 23 is arranged adjacent the carrier 20 and serves to remove the uppermost element 24 in a magazine 25 and position it on one of the supporting members 21 as the latter is moved past the loading means. A similar device 26 referred to as an unloading or removing means is arranged on the other side of the lapping member 12 and adjacent the carrier 20 for removing each of the elements 24, after they have been lapped, from their respective supporting member 21 and positioning the element in a receiving tank magazine 27.

The lapping member 12, see FIG. 4, is keyed to one end of a shaft 30 that is journaled in bearings 31 arranged within a sleeve 32 that is axially movable in bracket 13 and held against rotation by a suitable key connection not shown. The upper end 33 of sleeve 32 has a threaded portion 34 that threadedly engages a rotatable collar 29. A worm wheel 35 is fixed to collar 29 and engages a worm 36 on a shaft 37 that is driven by a motor 38 by means of a pair of gears 47. The shaft 30 has a pulley 39 keyed thereto at the end opposite the lapping member 12. Pulley 39 is connected by a belt 40 to a pulley 41 on shaft 42 of a motor 43. Motor 43 is fixed to a plate 44 that is pivotally mounted at 45 to support bracket 14. By means of an adjusting screw 46 that threadably engages plate 44 and bears against support bracket 14, the tension in belt 40 can be varied.

The lower portion 53 of sleeve 32 threadably engages a collar 48 which by means of a plurality of springs 49, as shown in FIGS. 2 and 4, to provide a continuous thrust on collar 29 so as to keep the latter in engagement with bracket 13, the springs 49 being retained in part by pins 54. Bracket 13 carries a segment lock 50 that is releasable by knob 51 and serves to maintain sleeve 32 in its adjusted position. However, upon release of lock 50, motor 38 can be energized to drive worm 36 and worm wheel 35 thereby moving sleeve 32 and by means of the threaded portions 34, 53 the lapping member 12 is moved in an axial direction for positioning the lapping surface 16 relative to the elements 24 on carrier 20. By this means the finished thickness of the element 24 can be varied and controlled within very exact limits.

Figure 3:
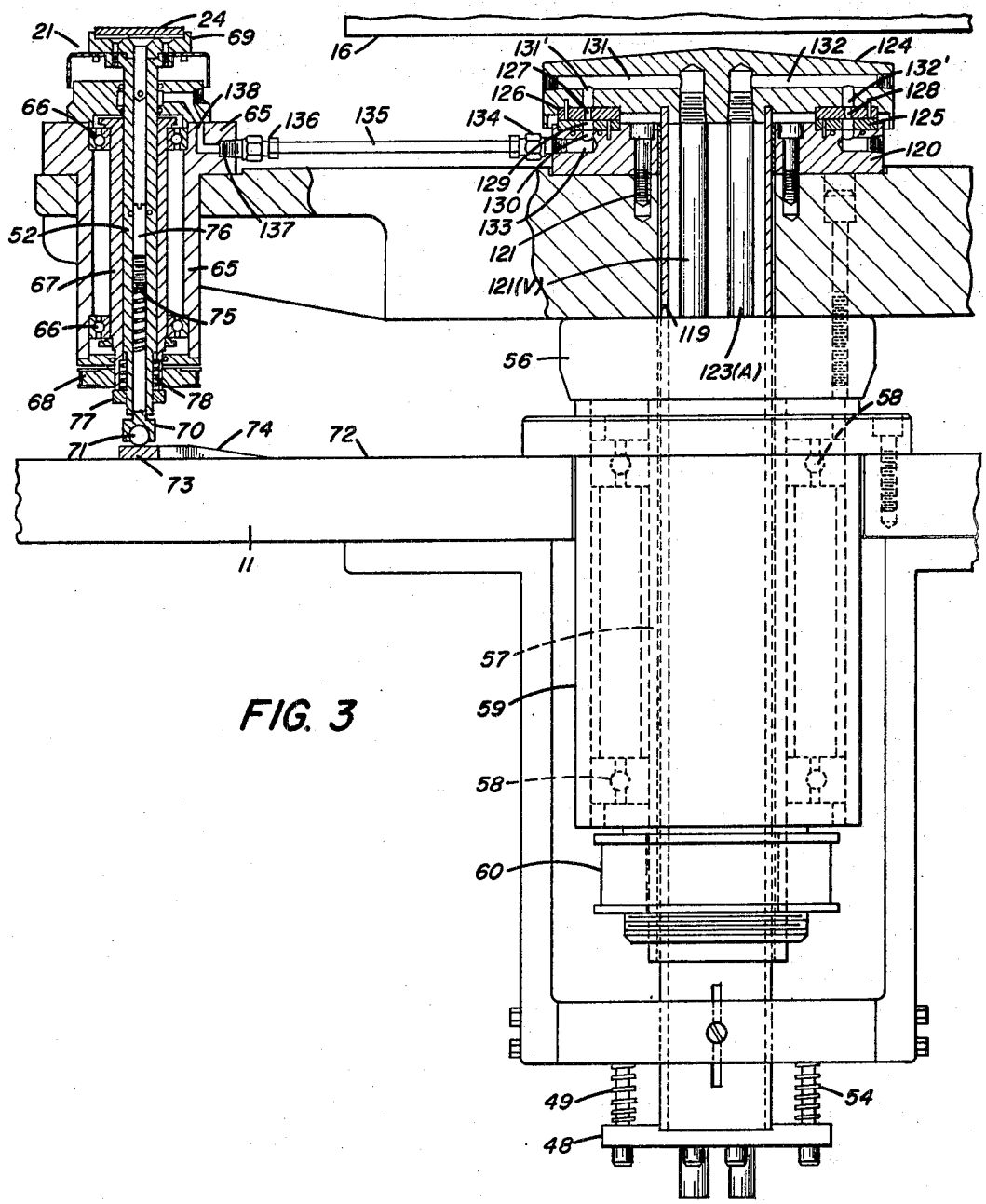
FIG. 3 is a vertical section through the carrier member and a support member thereon taken substantially along line 3—3 in FIG. 1.

The carrier 20, see FIGS. 1–3, comprises a cast disc 55 that is mounted on a collar 56 which, in turn, is part of the sleeve 57 journaled in bearings 58 contained in the cylindrical housing 59 that depends from the upper surface of bedplate 11, as shown in FIG. 3. Sleeve 57 carries a pulley 60 that is driven by belt 61 from a pulley 62 on the shaft motor 22.

As seen in FIG. 1, carrier 20 has a plurality of element supporting members 21 mounted adjacent the peripheral edge thereof. With reference to FIG. 3, the structure of one of the supporting members 21 will be described, all of said members being identical in structure. A sleeve 65 is fixed to carrier 20 and supports a pair of spaced bearings 66 in which a rotatable sleeve 67 is mounted. At one end, sleeve 67 carries a pulley 68 and within sleeve 67 another sleeve 52 is slidably mounted, the latter having a recessed cap 69 fixed to one end thereof on which an element 24 is retained in a manner to be described more fully hereinafter. Within sleeve 52 a follower 70 is slidably mounted, the follower 70 including a ball 71 which engages the top surface 72 of bedplate 11 until member 21 is moved into engagement with a plate cam 73 having a ramp 74 at each end that joins the top surface 72 of bedplate 11 with the top surface of the plate cam 73. Follower 70 is urged toward plate cam 73 by a spring 75 whose compression can be adjusted by a screw 76 within sleeve 52. The amount of vertical movement of element 24 toward lapping wheel 16 is determined by a collar 77 which threadably engages the other end of sleeve 52. A spring 78 arranged between sleeve 67 and collar 77 normally urges cap 69 away from lapping wheel 16. Spring 78 works in conjunction with spring 75 to determine the force with which the element 24 is urged against the lapping wheel 16, until collar 77 abuts the end of sleeve 67 at which time no further cutting action can occur.

With reference to FIG. 5 the drive means for rotating the supporting members 21 comprises a motor 80 which drives a pulley 81 connected by a belt 82 to a pulley 83. A plurality of pulleys 84 are arranged around the periphery of carrier 20 in a pattern, as seen in FIG. 5, and are connected by a belt 85 to the one pulley 84 that is on the same shaft as pulley 83. The pulleys 84 are arranged in the same plane as the pulley 68 on each of the supporting members 21. The configuration of pulleys 84 and pulleys 68 is such that belt 85 engages at least two of the pulleys 68 on either side of the lapping member 12 and those on the supporting members 21 immediately under the lapping member 12. An adjustable belt tightener 86 is arranged on each side of the lapping member 12, as shown in FIG. 5. With this arrangement, the drive means for supporting members 21 is coupled only to those of the supporting members moved into positions immediately ahead of, aligned with and immediately beyond the lapping member 12. The supporting member 21 so engaged by belt 85 are therefore rotated so as to provide random surface marks on the element 24 as it is moved through a path in which it is in engagement with the lapping wheel or surface 16.

The means for positioning an element 24 on each of the supporting members 21 and for removing the element 24 from each of said supporting members 21 is shown diagrammatically in FIG. 1 and in detail in FIGS. 6–8. These devices 23 and 26 are substantially the same in construction and are operated in timed relationship to movement of the supporting member relative thereto to perform their respective load and unload function. The description relative to stations 23 and 26 is therefore described only with respect to the load station 23.

With reference to FIGS. 6–8, a support or bracket 90 is mounted on bedplate 11 and carries a plate 91 that is pivotally mounted thereon by means of a stud 92. At the left-hand end of plate 91 as seen in FIG. 8, an air cylinder 93 is mounted and has its piston rod 94 connected to a plate 95 that is slidably mounted on plate 91. At the right-hand end of plate 95, a pair of spaced and freely rotatable rollers 96 are mounted, see FIG. 6. Plate 95 is provided with an elongated slot 97 that is engaged by a pin 98 fixed to plate 91 and through which a cam follower 102 extends, the slot, pin and cam follower providing means for guiding plate 95 as it is moved relative to plate 91. A plate 99 is pivotally mounted on plate 95 by means of a stud 100, the plate 99 being provided with a cam slot 101 that is engaged by the follower 102 carried by plate 91. At the right-hand end of plate 99, a bracket 103 is secured thereto and carries connectors 104 and 105 that are coupled to a vacuum source and an air source, respectively, for delivery of the same to a pickup member 106 which depends from bracket 103. Magazine 25 is mounted on bedplate 11 and is of a well known structure in which the uppermost element 24 is maintained at a predetermined level.

Let it be assumed that pickup member 106 is positioned over a supporting member 21 at the start of a cycle, as shown in FIG. 6. A switch LS3 will then have been actuated by a member 21 as it moved in a clockwise direction (FIG. 6) so that, as described hereinafter, air is being applied to cylinder 93 for urging plate 95 in a direction to hold rollers 96 against member 21. As the supporting member 21 is moved by carrier 20, plates 91 and 95 pivot counterclockwise about stud 92 until plate 91 strikes plunger 110 and moves the latter sufficiently to actuate a switch LS4. The air supply to cylinder 93 is then reversed and plate 95 is drawn toward the cylinder. At the same time, the plunger 110 urges plates 91 and 95 in a clockwise direction about stud 92 until plate 91 abuts pin 114 and further pivotal movement of plates 91 and 95 is arrested due to pins 98 and 114. However, plate 95 continues to move toward plunger 93. Since plate 99 is pivotally mounted on plate 95 and interconnected by cam slot 101 and follower 102, the movement of plate 95 toward plungetr 93 causes plate 95 and bracket 103 to pivot as a unit in a clockwise direction about stud 100 until pickup member 106 is over magazine 25. At this point, switch LS3 is again actuated and the direction of movement of plunger 93 is again reversed with the vacuum source then being connected to the pickup member 106 to pick up and remove an element 24 from the magazine 25. As the plunger 93 moves plate 95 toward carrier 20, the plate 95 is also pivoted about stud 100 due to cam slot 101 and follower 102. When rollers 96 engage the member 21 on which the element 24 is to be positioned, the pickup member 106 will then be over the same member 21. At this time, the vacuum will be cut off from member 106 and a blast of air will be applied to element 24 to effect transfer thereof to the member 21 on which it is also held by vacuum. This transfer takes place during the interval that the entire unit is being moved as described above, the complete cycle then being repeated. A more detailed explanation of the controls for the vacuum system follows with respect to FIGS. 9 and 10.

The cycle of operation described above occurs in an interval of time such that discrete elements 24 can be removed from the magazine 25 and positioned on each of members 21 as the latter are moved successively past the load station by the carrier 20. This same cycle of operation is followed with respect to unloading means 26 and receiving tank magazine 27. For removing an element 24, the pickup member 106' is moved with the member 21 for pickup, then to the magazine 27 for depositing it therein and then returns to its initial starting position over the next member 21, the difference being that an element 24 is deposited in the magazine 27, rather than removed therefrom. In order to limit the movement of the plates 91, 95 and 99 and for controlling the application of a vacuum source to the pickup member 106 via connections 104 and 105, a spring-biased plunger 110 is mounted on the support 90 as shown in FIG. 7. A threaded extension 111 has an adjustable collar 112 for engaging a switch LS4 associated with the control circuitry for the vacuum source. From FIG. 6 it will be readily evident that plunger 110 is operated only after pickup member 106 is positioned over one of the supporting members 21 and the plates 91, 95 and 99 are moved as a unit by carrier 21 through the medium of rollers 96. The angular movement of the plates is therefore controlled by plunger 110 and switch LS4, plunger 110 also serving to return plate 91 to its initial position against the stop pin 114 on support 90, as previously described.

The means for controlling the application of a vacuum source to the support members 21 is shown in FIGURE 3. The carrier 20 is provided with a plate 120 that is secured to the carrier by means of screws 121. A lead 122 for vacuum and a lead 123 for air extend through a sleeve 119 within sleeve 57 and terminate in a stationary cap 124. The cap 124 is separated from the plate 120 by means of rings 125 and 126 which are secured respectively to plate 120 and cap 124. The rings 125, 126 are made of a suitable antifriction material, such as Teflon, and are provided with arcuate slots 127 (vacuum), 128 (air) in ring 126 and a plurality of holes 129 which are angularly spaced in ring 125 in accordance with the angular spacing of support elements 21. The slots 127, 128 are connected to the leads 122, 123, respectively, by radial holes 131, 132 and axial holes 131', 132'. Each of the holes 129 is connected by a hole 130 in plate 120 to radial hole 133 which extends to the periphery of plate 120 for receiving a connection 134 on one end of a tube 135. The other end of tube 135 is joined to a connector 136 which is threaded into a hole 137 in the supporting member 21. This hole 137 is connected by a plaurality of holes in various parts of supporting member 21 to provide a passageway 138 to the stem of cap 69 on which an element 24 is positioned during movement between the load station 23 and the unload station 26.

With reference to FIGURE 1 it will be noted that the slots 127 and 128 in cap 124 bear a particular relationship to the loading means 23, the unloading means 26, and the lapping member 12. Since the cap 124 is fixed and the plate 120 moves relative thereto, the vacuum is applied to the support member 21 when an element 24 is positioned thereon at the loading station 23 via holes 131, 131', slot 127, holes 129, 130, 133, tube 135 and passageway 138, and is operative to retain the element thereon until it has been moved past lapping member 12. As the same supporting member 21 moves toward the unloading means 26, air is applied to the bottom of the element, via holes 132, 131', slot 128, holes 129, 130, 133, tube 135 and passageway 138 to move it toward the pickup member 106' in the unloading station 26. The continued application of air to the supporting member 21 removes any accumulated coolant before it reaches the loading means to accept another element 24.

In order to describe the operation of the lapping device more completely, reference will now be made to the diagrammatic disclosures of the vacuum and electrical components shown in FIGURES 9 and 10. Assuming that the supply magazine 25 has been filled with a plurality of elements 24, the loading means 23 and the unloading means 26 are each in a position relative to a supporting member 21, and the main switch SW1 has been closed to provide a source of potential for the various operating and control components. Switch SW2 is then closed which energizes lamp L1 to indicate its closed position and also the solenoid valve SV1 for supplying air to the lead or line 123. With closure of switch SW3, lamp L2 is energized as well as relay R1 which closes its contact R1A in the circuit of the motor 139 for the vacuum pump 140. Vacuum is then supplied to lead 122 under control of vacuum valves 150 and 151, to the load means 23 under control of solenoid valve SV10 and to the unload means 26 under control of solenoid valve SV13. Switch SW4 is then closed, thereby energizing lamp L3 and solenoid valve SV2 which controls the application of the coolant to the lapping member 12. The closure of switch SW5 energizes lamp L4 and relay R2 which, in turn, causes closure of its contacts R2A and R2B to energize motor 43 for driving the lapping member 12. With closure of relay contact R2C, switch SW6 can be closed to energize lamp L5 and relay R3, thereby closing its contacts R3A, R3B, and R3C. The closure of contacts R3A and R3B cause motor 22 to be energized, thereby driving the carrier 20 with the supporting members 21 thereon. With contact R3C closed, the switch SW8 can be closed, thereby energizing lamp L6 and relay R4 and closing its contacts R4A and R4B to energize motor 80 for driving the supporting members 21 that are under and in proximity to lapping member 12 by means of pulleys 84 and belt 85.

At this point the lapping device is completely operative with the various motors energized and the vacuum source and air source operating and connected to various solenoid-operated control valves. The lapping coolant is connected by lines 141 and 142 to nozzles 148, 149 located adjacent the lapping member 12 to provide the necessary cutting action between the surface 16 and the surfaces of the elements 24 that are being held against surface 16. The coolant is also connected by line 143 via valves SV5 and SV6 to a pair of moisture trap tanks 144 and 145. A limit switch LS1 is associated with tank 145 and a limit switch LS2, is associated with tank 144. By means of these switches, as described hereinafter, only one tank at a time is operative to receive any moisture that may be introduced into the vacuum system. Assuming that tank 145 is filled, the switch LS1 is controlled by a float 146 has its contacts LS1A and LS1B closed thereby energizing relay R5 which will be held in with closure of its contact R5A and closed switch LS2 so that solenoid valve SV5 will be energized to a shut-off position to prevent any more moisture from entering tank 145. Relay R5 also close its contacts R5B and R5C to energize the 4-way solenoid valves SV3 and SV4 to control entry of air into the proper tank. Tank 144 becomes operative as tank 145 is being emptied via relay contact R5D which is opened to deenergize solenoid valve SV8 to close the drain end of the tank, and with float 147 in an empty position the contacts LS2A and LS2B of switch LS2 are closed, so that solenoid valve SV6 is energized and opened to permit entry of any moisture into tank 144. When tank 144 is filled, the contacts of switch LS2 are opened, relay R5 is deenergized and functions of the valves are reversed, that is SV5 and SV8 are opened and SV6 and SV7 are closed. With this arrangement there is no shut down time required for draining moisture from the vacuum system.

With the actuation of the switches in proper sequence as described above, the carrier 20 is moving the supporting members 21 in a circular path and under the lapping wheel 16. Air or vacuum is applied to each of the supporting members 21 by means of the distributor valve comprising plate 125 and 126 associated with sleeve 57. The vacuum is applied to each supporting member from the time it receives an element 24 at supply station 23 until the same element 24 has been moved out from under the lapping wheel 16. As the same element 24 approaches the unloading station 26, air is then applied to the underside of the element 24 to aid in its being withdrawn from the supporting member 21 by the pickup member 106′ associated with the unloading mechanism.

A switch LS3, see FIG. 1, is located adjacent the load station 23 and is actuated in proper timed sequence by the peripheral edge of each supporting member 21 as it passes thereby. A switch LS4 is actuated by collar 112 and a switch LS5 is actuated by a similar collar by the mechanism in the unload station 26.

With reference to FIG. 10, the momentary closing of switch LS3 by a supporting member 21 on carrier 20 causes relay R6 to be energized which closes its contact R6A to energize a relay R7. Simultaneously, contact R6B is closed thereby energizing a relay R8. Relays R7 and R8 are held in by their respective contacts R7A and R8A in conjunction with switches LS4 and LS5. The contact R7B is also closed with the energization of relay R7, thereby energizing the solenoid valves SV9 and SV10 and R7C is opened to deenergize and open solenoid valve SV11. Solenoid valve SV9 is closed when energized to permit air to be supplied to cylinder 93 via SV11 for urging the load mechanism toward the supporting member 21 as described above. Also, solenoid valve SV10 is closed to disconnect the vacuum source to pickup head 106 for releasing the element 24 with air supplied via SV11. At the same time, contact R8B is closed thereby energizing solenoid valve SV12 which shuts off the air supplied to cylinder 93′ for actuating the unload mechanism 26 and to pickup head 106′. At the same time, contact R8C is opened thereby deenergizing solenoid valves SV13 and SV14 and so that the vacuum is applied to pickup head 106′ whereby an element 24 is picked up. The closing of solenoid valve SV14 causes the air supply to actuate cylinder 93′ in a direction to move pickup head 106′ toward magazine 27. When switch LS4 is actuated by collar 112 the action of the loading mechanism is caused to reverse as already described. With LS4 opened, relay R7 is deenergized thereby permitting solenoid valves SV9, SV10 and SV11 to return to their initial positions, so that air is now supplied to cylinder 93 for moving it in a reverse direction and the vacuum is applied to pickup member 106 to withdraw an element from magazine 25. In a similar manner, the switch LS5 associated with the unload station is opened to deenergize relay R8 to cause solenoid valves SV12, SV13 and SV14 to return to their initial condition when the pickup head 106′ has been pivoted in a counterclockwise direction (FIG. 1), to connect the vacuum source thereto and which is disconnected from the pickup member 106′ for releasing the element 24 thereon into magazine 27 with the next actuation of switch LS3. Air is then applied to cylinder 93′ to move the mechanism toward carrier 20 to retrieve the element 24 on the next supporting element 21. The complete cycle is repeated with actuation of switch LS3 by the next supporting element 21.

By means of a transformer T1 and a rectifier SR1 an alarm device 117 is energized when the supply of elements 24 are at a predetermined level in magazine 25. This alarm is energized by a microswitch LS6 associated with a control member, not shown, in the magazine 25.

From the above description it will be evident that the unload and load devices 26 and 23 work in unison and that the vacuum and air are controlled by switches LS3 and LS4. As each element 24 is moved by the carrier 20 toward the lapping wheel 16, the ball 71 engages the ramp 74 to move the element toward the wheel to remove an amount of material from the surface engaging the wheel so that each of the elements is of a predetermined thickness. Further, each element is rotated by the belt arrangement shown in FIG. 5 so that each element 24 is brought up to a predetermined speed before actually engaging the cutting surface of wheel 16, thereby producing a surface having random cutting marks.

As described above, a coolant is used as a lapping lubricant and since it is directed against elements 24 and wheel 16, provisions must be made to remove the coolant that is drawn into the vacuum system. It is in connection with removal of this coolant from the vacuum system that tanks 144 and 145 are used.

The invention has been described in detail with particular reference to preferred embodiments thereof, but it will be understood that variations and modifications can be effected within the spirit and scope of the invention.

I claim:
1. In a device for lapping the planar surface of an element, the combination comprising:
 a rotatable member having a planar lapping surface;
 a carrier for continuously moving a plurality of said elements in a path extending across a portion of said lapping surface;

a plurality of element supporting means, each of said supporting means being rotatably mounted in spaced relation to each other in said carrier and being movable independently in a direction toward and away from said lapping surface;

drive means for rotating said supporting means;

means arranged ahead of said rotatable member in the direction of movement of said carrier for positioning a discrete element on each of said supporting means; and actuating means for successively engaging and moving each of said supporting means in a direction toward said lapping surface to position said element thereon completely in engagement with said lapping surface after said element is substantially aligned with said lapping surface and for disengaging said element by permitting movement of said supporting means away from said lapping surface before reaching the end of said path; and resilient means carried by each of said supporting means and independently adjustable for establishing the pressure with which its element will be maintained against said lapping surface and for limiting the amount of material that will be removed therefrom while being moved through said path and, means for adjusting said resilient means.

2. A device in accordance with claim 1 including means comprising a vacuum source and valve means for coupling said sources to each of said supporting means successively as each of the latter approaches said positioning means.

3. A device in accordance with claim 1 including means arranged beyond said rotatable member in the direction of movement of said carrier for removing each of said elements from its respective supporting means.

4. A device is accordance with claim 1 wherein said drive means is coupled to only those of said supporting means moved into positions immediately ahead of, aligned with and immediately beyond said lapping surface.

5. A device in accordance with claim 3 including means comprising a vacuum source and valve means for coupling said source to each of said supporting means successively as each of the latter approaches said positioning means and for disengaging said source from each of said supporting means successively as each of the latter approaches said removing means.

6. A device in accordance with claim 1 wherein said carrier is rotatably mounted for moving said elements in a plane parallel to that of said lapping surface and in an arcuate path across a portion of said lapping surface, whereby each of said elements, when moved into engagement with said lapping surface, is subjected to a progressively varying lapping action as it is moved through said path.

7. A device in accordance with claim 6 wherein the axis of rotation of said carrier is parallel to and spaced from the axis of rotation of said rotatable member and said arcuate path intersects a line in a plane defined by said axes that is parallel to said axes and perpendicular to the plane of said surface, said line being spaced from said axis of rotation of said rotatable member in the same direction that the latter is spaced from the axis of rotation of said carrier.

8. A device in accordance with claim 1 wherein said supporting means are arranged in a circular pattern on said carrier so that said elements on said carrier are moved in an arcuate path across said lapping surface for completely engaging the latter at a continuously varying speed.

9. A device in accordance with claim 1 wherein said carrier is rotatably mounted on an axis spaced from and parallel to the axis of rotation of said rotatable member and both of said axes are on the same side of and spaced from said path.

10. A device in accordance with claim 1 wherein each of said supporting means comprises a rotatable member having a recess at one end for receiving said element and including a cam follower at the other end, resilient means adjacent said other end for moving said rotatable member in one axial direction, and means limiting movement of said member in the other axial direction for controlling the amount of material to be removed from its respective element.

11. A device in accordance with claim 1 wherein said drive means comprises at least two members arranged in spaced relation to said carrier member, a drive source coupled to one of said members, and an endless belt engaging said members and only those of said supporting means in said path.

12. A device in accordance with claim 1 wherein said actuating means comprises a cam extending in a direction corresponding to said path, said cam having a first portion for moving said element on each of said supporting means toward said lapping surface after said element is aligned with said lapping surface, a second portion for maintaining said element on each of a plurality of said support means in engagement with said lapping surface, and a third portion for disengaging said element on each of said supporting means from said lapping surface before reaching the end of said path.

13. A device in accordance with claim 1 wherein said positioning means comprises a supply station arranged adjacent said carrier for receiving a plurality of said elements in stacked relation; a loading member movable between a first position that is relative to said supply station and a second position that is relative to each of said element supporting means as the latter moves past said supply station, a vacuum source connectable to said loading member during the time that the latter is in said first position to pick up one of said elements and movable to said second position for positioning said one element on said element supporting means; and means coupled to said loading member for cyclically moving the latter between said first and second positions in timed relation to the movement of said carrier.

References Cited

UNITED STATES PATENTS

| | | | |
|---|---|---|---|
| 816,550 | 3/1906 | Holub | 51—134 X |
| 1,263,057 | 4/1918 | Griffin | 51—134 |
| 1,646,132 | 10/1927 | Barry | 51—134 |
| 2,020,709 | 11/1935 | Walter | 51—215 |
| 2,326,034 | 8/1943 | Jackson | 51—134 |

FOREIGN PATENTS 985,074 3/1951 France.

HAROLD D. WHITEHEAD, Primary Examiner